Dec. 18, 1962 F. HENNIG 3,069,497

TELEPRINTER SIGNAL TRANSMISSION EMPLOYING A SECURING CODE

Filed Dec. 19, 1960 2 Sheets-Sheet 1

United States Patent Office 3,069,497
Patented Dec. 18, 1962

3,069,497

TELEPRINTER SIGNAL TRANSMISSION EMPLOYING A SECURING CODE

Fritz Hennig, Munich-Solln, Germany, assignor to Siemens & Halske Aktiengesellschaft Berlin and Munich, a German corporation Filed Dec. 19, 1960, Ser. No. 76,718
5 Claims. (Cl. 178—69)

Figures 1A, 1B:
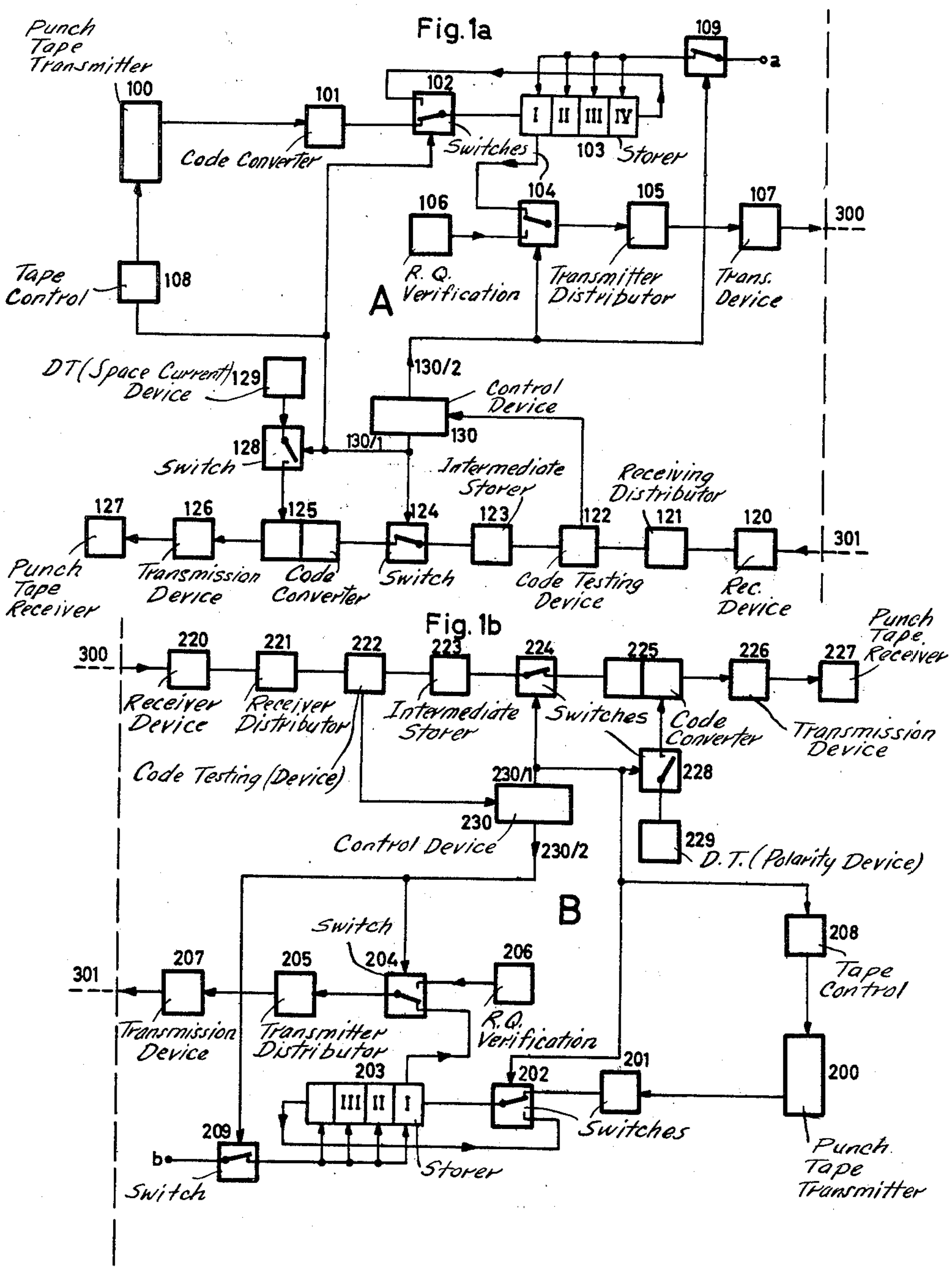

This invention relates to teleprinter symbol transmission and is particularly concerned with teleprinter transmission, especially wireless transmission, of teleprinter symbols, employing a securing code. The present disclosure is a continuation-in-part of the co-pending application Serial No. 802,955, filed March 30, 1959, which is owned by the assignee also named in the present case, now abandoned.

The customary teleprinter code has the well recognized drawback that a completely different symbol (character, numeral, etc.) is produced upon falsification of a single symbol or signal element, and that it cannot be recognized at the receiver whether or not the received symbol actually corresponds to the transmitted symbol. However, the use of a socalled securing code permits, depending upon the kind of code employed and especially upon the number of signal elements for the individual symbols, to indicate and even to correct at the receiver more or less of the disturbance.

A securing code is employed particularly in connection with wireless teleprinter connections which are known for disturbances caused, for example, by interference fields or by fading.

Most varied types of codes have become known as securing codes. One type provides for each individual teleprinter symbol a fixed ratio of space to mark signal elements. The best known code of this type is the socalled 7-element code, in which each individual symbol is composed of three space elements and four mark elements. The fact that an error is present can be ascertained at the receiver by the use of a code testing device in case a symbol is received which does not have this ratio of space to mark elements. This results in a relatively great number of symbols which have to be verified and an automatically operating check-back or verification device is therefore usually provided which effects transmission of a verification signal from the receiver to the transmitter whenever the code testing device recognizes an erroneous symbol. The transmitting station is thus caused to retransmit previously transmitted symbols.

Other securing codes have become known which permit to ascertain at the receiver whether a symbol is erroneous or correct and accordingly, requiring verification or making verification unnecessary.

The invention is concerned with a teleprinter transmission system provided with automatically operating check-back or verification. The system includes a transmitting station for transmitting to a receiving station teleprinter symbols coded in securing code, the receiving station comprising a code testing device which effects in the presence of non-correctible errors transmission of a verification signal to the transmitting station so as to cause the latter to retransmit several of the previously transmited symbols which had been temporarily stored in a storer at the transmitter.

According to the invention, the capacity of such storer permits storing of a plurality of the last transmitted symbols, including the symbol which precedes a disturbed symbol, so that retransmission, responsive to a verification signal starts with such preceding symbol. The advantage resides in considerable reduction of the number of erroneous symbols, since there is great probability that the symbols adjacent to the symbol which the code testing device recognized as being erroneous, are likewise falsified but had been erroneously evaluated by the code testing device, for example, due to transposition errors.

The various objects and features of the present invention will appear from the description which is rendered below with reference to the accompanying drawings, showing a teleprinter symbol transmission system with automatic verification, in which teleprinter symbols are transmitted in two-way operation in opposite directions. The principle of operation of such a transmission system is known, for example, from the U.S. Patent No. 2,313,980.

Figure 2:
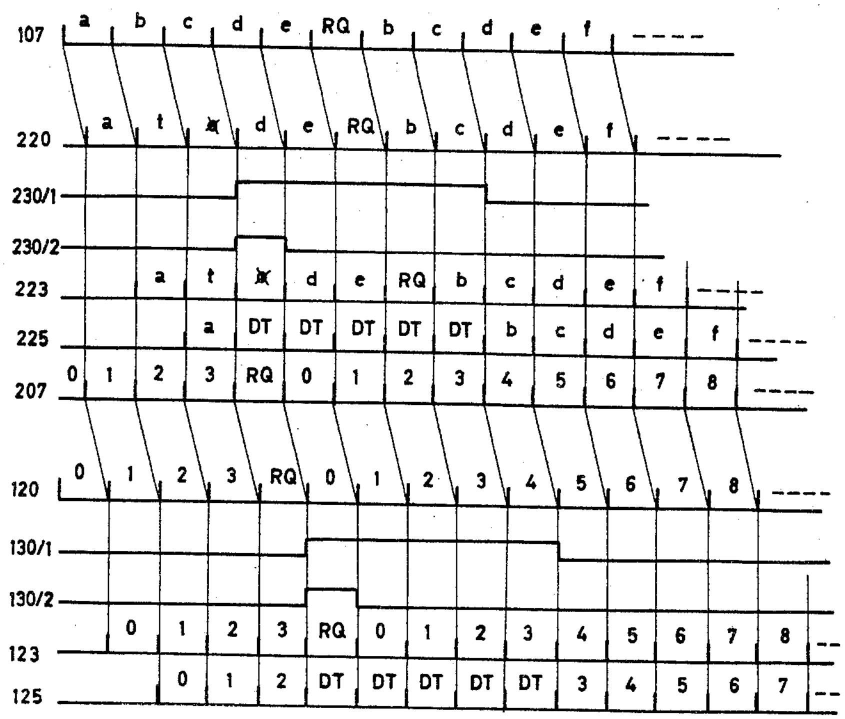

FIGS. 1*a* and 1*b* show an example of the system in the case of normal transmission conditions, that is, all switching devices are indicated in the condition in which they are in trouble-free operation; and FIG. 2 represents in diagrammatic manner salient features of the system which are operable in transmitting and receiving symbols.

The operation is as follows:

The punched tape transmitter 100 (station A—FIG. 1*a*) transmits 5-element teleprinter symbols in parallel representation to the code converter 101 which effects conversion thereof into the 7-element code. The symbols of the 7-element code are extended from the output of the code converter 101 over the switch 102 to the storer or shift register 103, the storage content of which is stepped along in the rhythm of the individual teleprinter symbols, by timing pulses conducted to the terminal "*a*" which are extended over the switch 109. The storage content present at any instant in the first stage of the storer 103 is extended over the switch 104 to the transmitter distributor 105 which converts the individual elements of the 7-element symbol into series representation so as to effect transmission over the transmission channel 300 by way of the transmission device 107. An example of symbols transmitted by the transmitting device 107 is shown in line 107 in FIG. 2.

The transmitted symbols are received at the station B (FIG. 1*b*) in the receiver device 220. Such received symbols are represented in line 220 of FIG. 2, the transmission time over the channel 300 being assumed to amount to one half symbol length. The receiver distributor 221 converts the serially incoming elements of each symbol into parallel representation and extends them to the code testing device 222 which examines the symbols as to the correct 3 to 4 ratio, at the same time testing with respect to the presence of a verification signal RQ. A suitable code testing device is described in U.S. Patent No. 2,552,126. The symbols are extended from the code testing device 222 to an intermediate storer 223 with a storage capacity corresponding to one symbol. Accordingly, and as will be seen from line 223 of FIG. 2, there is in the intermediate storer 223 stored the symbol which precedes the just received teleprinter symbol. From the intermediate storer 223, the symbols are extended over the switch 224 to the device 225 in which they are converted from the 7-element to the 5-element code and in which they remain stored up to the instant of further transmission. The symbols appearing at the output of the device 225 are represented in line 225 in FIG. 2. They are extended for further transmission to the device 226 and to the punched tape receiver 227.

Teleprinter symbols are in completely analogous manner transmitted over the channel 301 from the punched tape transmitter 200 of the station B (FIG. 1*b*) to the punched tape receiver 127 of the station A (FIG. 1*a*). The symbols transmitted from the transmitter device 207 of the station B are represented in line 120 of FIG. 2. The teleprinter symbols stored in the intermediate storer 123 of station A are represented in line 123 of FIG. 2. At the output of the device 125 of the station A are obtained the symbols represented in line 125 of FIG. 2.

As will be seen from FIG. 2, line 107, the symbol or character "a" was correctly transmitted from the transmitting device 107 of the station A to the receiving device 220 of the station B. The character "b" however was due to a transposition error falsified into the character "t." This error had not been recognized by the code testing device 222 since the character "t" likewise exhibits the correct 3 to 4 ratio. The character "c" has been recognized as falsified by the code testing device owing to the absence of the 3 to 4 ratio, thus producing an error symbol ⊗. This error symbol effects actuation, under control of the code testing device 222, of a control circuit 230 which in turn effects over the control line 230/1 actuation, for the duration of five symbols, of the switches 224, 228 and 201 as well as of the device 208, and over the control line 230/2 the actuation, for the duration of one symbol, of switches 204 and 209. This is represented in FIG. 2 in lines 230/1 and 230/2. Since the switch 224 is open, the symbols will not be extended from the intermediate storer 223 to the device 225. The switch 228 is at the same time closed and, accordingly, a device 229 is connected to the device 225. The device 229 is effective to produce at the output of the device 225 prolonged space polarity DT as is represented in line 225 of FIG. 2. The switch 202 is at the same time actuated, whereby the output of the stage IV of the storer 203 is connected with the input of the stage I of such storer. The device 208 prevents further reading of symbols from the punched tape transmitter 200. The switch 209 is moreover opened, thereby extending a shift pulse for the storer 203. The device 206 is over the actuated switch 204 connected to the transmitter distributor 205 for the duration of one symbol. The device 206 produces the check-back or verification signal RQ which is now transmitted over the transmitting device 207 and channel 301 to the station A (FIG. 1*a*). See FIG. 2, lines 207 and 120.

The code testing device 122 of station A (FIG. 1*a*) recognizes the RQ-verification signal, thereby effecting actuation of the control device 130. The switches 124, 128 and 102 as well as the device 108 are now actuated, for the duration of five symbols, over the control line 130/1, and the switches 104 and 109 are actuated, for the duration of one symbol, over the control line 130/2, such actuation being represented in lines 130/1 and 130/2 in FIG. 2.

Since the switch 124 is open, no more symbols are extended from the intermediate storer 123 to the device 125. The device 129 is at the same time connected to the device 125 over the closed switch 128. The device 129 is effective to produce at the output of the device 125 prolonged space current DT which is extended to the transmission device 126 and the punched tape receiver 127. This is represented in line 125 of FIG. 2. The switch 102 is in alternate actuated position and the output of the stage IV of the storer 103 is accordingly connected with the input of stage I. The device 108 is operative to prevent further reading-out of symbols from the punched tape transmitter 100. Since the switch 109 is opened for the duration of one symbol, the storer 103 will receive one shift impulse less. The device 106 is at the same time connected to the transmitter distributor 105 over the actuated switch 104. The RQ-verification signal is produced in the device 106 and is transmitted to the station B (FIG. 1*b*) over the transmitter device 107 and the transmission channel 300. This is represented in line 107 of FIG. 2. The verification or repetition cycle is thus initiated at the station A (FIG. 1*a*). The switches 104 and 109 are restored to normal by control over the control line 130/2 after the RQ signal has been transmitted. The content of the storage stage IV of the storer 103 is now transferred over switch 102 to the stage I, such operation being effected responsive to the next timing pulse which is extended over the switch 109. As will be seen from the drawings, the symbol "b" is now transmitted from the stage I of the storer 103 over the switch 104, transmitter distributor 105, the transmission device 107 and channel 300, followed by the transmission of the symbols "c"—"d"—"e" which had been stored in the stages III, II and I of the storer 103. The repetition or verification cycle is now completed. The switches 102, 124, 128 and the device 108 are restored to normal and the symbol transmission is resumed.

At the station B (FIG. 1*b*) and upon expiration of a predetermined time interval, the switches 224, 228 and 201 and the device 208 are restored by control over the control line 230/1, while the switches 204 and 209 are restored by control over the control line 230/2. As will be seen from the drawings and particularly from line 225 of FIG. 2, the verification also includes repetition of the symbol "b" which precedes the disturbed symbol "c." The operation in the opposite communication direction is analogous, that is, in the transmission from the station B to the station A, the symbol 3 preceding the signal RQ is also repeated. See also line 125 in FIG. 2.

Accordingly, as compared with known systems operating with automatic verification, the storer of the transmitting station (103, 203) must be adapted to store in each case one more symbol. Moreover, an intermediate storer (223, 123) is required at the receiving station, which is adapted to always store one symbol. The remaining structure of the system can remain substantially unaltered.

It is of course understood that the invention is applicable in connection with other codes, for example, a 10-element code, as well as in connection with time multiplex systems operating with automatic verification. It is likewise understood that given functions, for example, the transmission of a check-back or verification signal, responsive to receipt of a falsified symbol, can be effected manually instead of automatically.

Changes may be made within the scope and spirit of the appended claims which define what is believed to be new and desired to have protected by Letters Patent.

I claim:

1. A teleprinter symbol transmission system, wherein teleprinter symbols coded in a securing code are transmitted from a transmitting to a receiving station, and wherein the receiving station is provided with a code testing device which effects, responsive to recognition of non-correctible errors, transmission of a verification signal to the transmitting station for the purpose of causing the transmitting station to retransmit previously transmitted symbols which had been stored temporarily in a storer, the improvement which comprises means for always storing in said storer in the course of transmission a plurality of last transmitted teleprinter symbols including the symbol preceding the one which had been recognized as disturbed and the repetition of which is signalled by the verification signal, and means for thereupon effecting retransmission including retransmission of such preceding symbol followed by retransmission of the disturbed symbol.

2. A teleprinter symbol transmission system according to claim 1, comprising at the receiving station an intermediate storer electrically connected to the output of the code testing device, means for storing in said intermediate storer the symbol preceding a symbol which is being received, symbol evaluation means and receiver recording means connected with the output of said intermediate storer, and means responsive to recognition of a disturbed symbol by said code testing device for interrupting the extension of symbols from the intermediate storer for the duration of symbol repetition.

3. A teleprinter symbol transmission system according to claim 2, including two teleprinter stations connected for two-way communication, wherein each station is provided with a code testing device and with a storer as well as with an intermediate storer as specified.

4. A teleprinter symbol transmission system comprising two stations and channel means for interconnecting said stations for two-way communication, each station having means for transmitting to the other station teleprinter symbols coded in securing code and means for receiving and evaluating symbols received from the other station, said transmitting means comprising a storer device which is in the course of transmission operable to always store a plurality of transmitted symbols, said receiving and evaluating means comprising a code testing device, means controlled by said code testing device upon receipt of a disturbed symbol for temporarily storing the last received undisturbed symbol and for interrupting evaluation of further symbols and for transmitting to the transmitting station a verification signal signifying that the symbol succeeding the last received undisturbed symbol had been disturbed, means operable at the transmitting station responsive to the receipt of said verification signal for temporarily interrupting further transmission of symbols and for releasing from said storer device symbols stored therein including the disturbed symbol and the symbol preceding the disturbed symbol, said released symbols being retransmitted to the receiving station to effect correction of the disturbed symbol and to verify correctness of the symbol preceding the disturbed symbol, and means for thereafter resuming transmission of symbols from the transmitting to the receiving station and evaluation thereof in the receiving station.

5. A teleprinter symbol transmission system comprising two stations and channel means for interconnecting said stations for two-way communication, means at each station for respectively transmitting to the other station teleprinter symbols coded in securing code and for receiving such symbols, means at each station responsive to the receipt of a disturbed symbol for transmitting to the other station a verification signal signifying the receipt of the disturbed symbol, means operative responsive to the transmission of said vertification signal for temporarily interrupting transmission of further symbols at the transmitting station and for temporarily storing the last undisturbed symbol received at the receiving station, means at the transmitting station for thereupon retransmitting to the receiving station the disturbed symbol and the symbol preceding said disturbed symbol, and means at the transmitting station for thereafter resuming transmission of symbols and at the receiving station for receiving such symbols.

References Cited in the file of this patent

UNITED STATES PATENTS 2,706,215 Van Duuren ............. Apr. 12, 1955